United States Patent
Cheng (10) Patent No.: US 7,051,104 B1
(45) Date of Patent: May 23, 2006

(54) SYSTEM AND METHOD FOR EXTENDING THE ITU Q.922 LAPF VIRTUAL CIRCUIT DISCONNECT LOGIC TO PREVENT UNSYNCHRONIZED VIRTUAL CIRCUIT ESTABLISHMENT

(75) Inventor: Chifei Wei Cheng, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 243 days.

(21) Appl. No.: 09/745,851

(22) Filed: Dec. 21, 2000

(51) Int. Cl.
*G06F 15/16* (2006.01)

(52) U.S. Cl. ..................................... 709/227; 719/318

(58) Field of Classification Search ................ 709/227, 709/228, 200–207, 217–226, 310, 312, 313, 709/318, 328, 314, 315, 316; 719/310–318, 719/328–332
See application file for complete search history.

(56) References Cited

U.S. PATENT DOCUMENTS

| | | | | |
|---|---|---|---|---|
| 5,553,135 | A * | 9/1996 | Xing | 379/399.01 |
| 5,905,714 | A * | 5/1999 | Havansi | 370/242 |
| 6,333,932 | B1 * | 12/2001 | Kobayasi et al. | 370/389 |
| 6,339,565 | B1 * | 1/2002 | Zhao | 369/44.28 |
| 6,421,337 | B1 * | 7/2002 | Rao et al. | 370/351 |
| 6,493,352 | B1 * | 12/2002 | Mawhinney et al. | 370/458 |
| 6,526,056 | B1 * | 2/2003 | Rekhter et al. | 370/392 |
| 6,587,464 | B1 * | 7/2003 | Brown et al. | 370/394 |
| 6,597,689 | B1 * | 7/2003 | Chiu et al. | 370/354 |
| 2002/0137512 | A1 * | 9/2002 | Jahn | 455/435 |

OTHER PUBLICATIONS

Mike Fontenot, Apr. 20, 1998, MCI e-mail, p. 1.*
iDA Singapore, Issue 1, Rev 2, Dec. 1, 1999, pp. 1 and 14.*
Private Communication regarding SVC Layer 2 Disconnect, Apr. 20, 1998.
ITU Recommendation Q.921, "ISDN User-Network Interface-Data Link Layer Specification", Mar. 1993.
ITU Recommendation Q.922, "ISDN Data Link Layer Specification for Frame Mode Bearer Services", 1992.

* cited by examiner

*Primary Examiner*—John Follansbee
*Assistant Examiner*—Haresh Patel
(74) *Attorney, Agent, or Firm*—Cindy Kaplan (57) ABSTRACT

A system and method for extending and modifying the ITU Q.922 LAPF disconnect logic to remedy or alleviate unsynchronized virtual circuit establishment instances between a first device and a second device are disclosed. The method generally includes transmitting a disconnect request message to the first device in response to a data link establish request and transmitting a request for connection to establish link message to the second device upon one of expiration of an awaiting-response timer, receiving a disconnect mode message from the second device and receiving an acknowledgement message from the second device.

16 Claims, 8 Drawing Sheets

SYSTEM AND METHOD FOR EXTENDING THE ITU Q.922 LAPF VIRTUAL CIRCUIT DISCONNECT LOGIC TO PREVENT UNSYNCHRONIZED VIRTUAL CIRCUIT ESTABLISHMENT

BACKGROUND OF THE INVENTION

The present invention relates generally to a system and method for extending the ITU Q.922 LAPF (link access procedures for Frame Mode bearer services) virtual circuit disconnect logic. More specifically, a system and method for extending and modifying the ITU Q.922 LAPF disconnect logic to remedy or alleviate instances of unsynchronized virtual circuit establishment are disclosed.

Frame Relay is a packet switching protocol for connecting devices on a wide area network (WAN). Frame Relay operation is in part specified by ITU Recommendation Q.922 (Geneva, 1992) entitled "ISDN Data Link Layer Specification For Frame Mode Bearer Services" published by the ITU. Recommendation Q.922 relates to the Digital Subscriber Signaling System No. 1 (DSS 1) data link layer and specifies the frame structure, elements of procedure, format of fields and procedures of the data link layer to support frame mode bearer services in the user plane (U-plane) as defined in ITU Recommendation I.233 (frame mode bearer services).

Recommendation Q.922 contains a deficiency in that it is possible to have instances of unsynchronized SVC establishment due to one device going through system reboot and shutting down all active SVCs while a peer device believes that these SVCs are still active. To mitigate this deficiency, it has been suggested that, at the first attempt of bringing up the L2 (layer 2) link during system re-initialization, a DISC (disconnect) message be transmitted prior to the specified transmission of a SABME (Set Asynchronous Balanced Mode Extended) message. The SABME message is in essence a message for requesting establishment of the link. The SABME and DISC messages are defined by ITU Recommendation Q.921. According to this proposed solution, the DISC message is transmitted in all situations in which link layer services (LAPF) are restarted.

However, the proposed solution does not satisfactorily or fully resolve the unsynchronized SVC establishment issue. Therefore, what is needed is a system and method for extending and modifying the ITU Q.922 LAPF disconnect logic to better remedy or alleviate instances of unsynchronized SVC establishment.

SUMMARY OF THE INVENTION

A system and method for extending and modifying the ITU Q.922 LAPF disconnect logic to remedy or alleviate unsynchronized virtual circuit establishment instances is provided by virtue of one embodiment of the present invention. In this way, if either end of an LAPF link between a user device and a peer device providing a connection to a Frame Relay network goes down and comes back up, it is assured that both ends of the link understand that all virtual circuits have been torn down or released. The extension provided by the present invention may be implemented at either or both ends of the link. Protection against unsynchronized virtual circuit establishment instances is provided if the end that goes down and comes back up is equipped with the extension.

According to one aspect of the present invention, a method for establishing a link from a first device to a second device generally includes transmitting a disconnect request message from the first device to the second device in response to a data link establish request, and transmitting a request for connection to establish link message from the first device to the second device upon one of expiration of an awaiting-response timer, receiving a disconnect mode message from the second device at the first device, or receiving an acknowledgement message from the second device at the first device.

These and other features and advantages of the present invention will be presented in more detail in the following detailed description and the accompanying figures which illustrate by way of example the principles of the invention.

DESCRIPTION OF SPECIFIC EMBODIMENTS

A system and method for extending and modifying the ITU Q.922 LAPF disconnect logic to remedy or alleviate unsynchronized virtual circuit establishment instances are disclosed. The discussion herein assumes detailed familiarity with Frame Relay systems and link layer services such as LAPF that support Frame Relay connectivity as part of the knowledge of those of skill in the Frame Relay art. Many of the terms used herein are defined and explained in one of the following documents:

ITU Recommendation Q.922 (Geneva, 1992) entitled "ISDN Data Link Layer Specification for Frame Mode Bearer Services."

ITU Recommendation Q.921 (Geneva, 1997) entitled "ISDN User-Network Interface—Data link Layer Specification."

ITU Recommendation Q.920 (Geneva, 1993) entitled "Digital Subscriber Signalling System No. 1 (DSS 1)—ISDN User-Network Interface Data Link layer—General Aspects."

ITU Recommendations I.233, I.233.1 and I.233.2 (Geneva, 1991) entitled "Frame Mode Bearer Services, ISDN Frame Relaying Bearer Service and ISDN Frame Switching Bearer Service."

The entire contents of all of these documents including all annexes and appendices are incorporated by reference for all purposes.

Also, although the present invention is described in relation to supporting establishment of switched virtual circuits (SVCs), it is applicable to link establishment and virtual circuit establishment generally.

Hardware and Software Implementation

A software or software/hardware data communication system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the data communication systems of this invention may operate on specially configured routers or switches such as those available from Cisco Systems, Inc. of San Jose, Calif. A general architecture for some of these machines will appear from the description given below. In an alternative embodiment, the data communication system may be implemented on a general-purpose network host machine such as a personal computer or workstation adapted to interface with computer networks.

Figure 1:
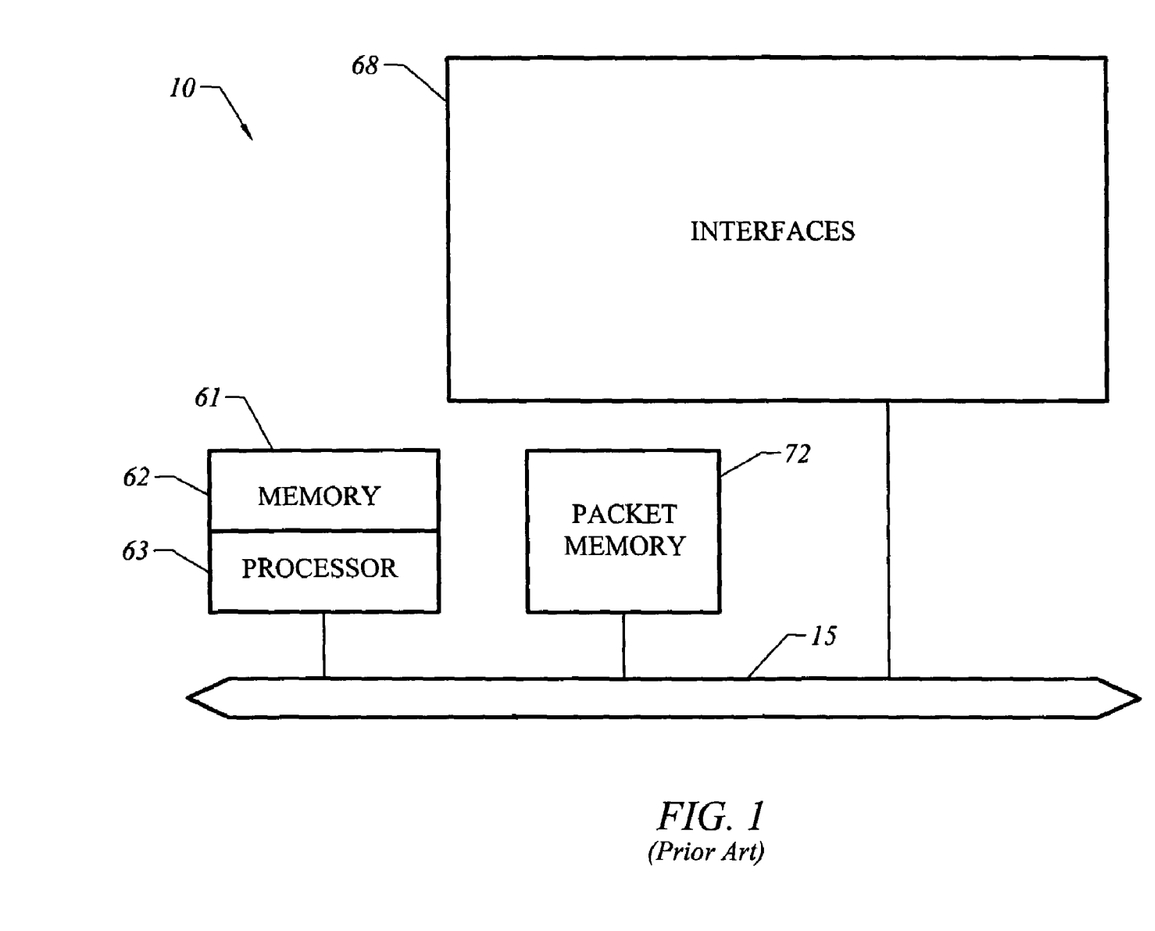
FIG. 1 is a block diagram illustrating a link over a frame relay network.

Referring now to FIG. 1, a network device 10 suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such tasks such as network management and general processing of packets. It preferably accomplishes all these functions under the control of software including an operating system (e.g., a version of the Internetwork Operating Systems (IOS®) of Cisco Systems, Inc.) and any appropriate applications software. CPU 61 may include one or more processors 63 such as a processor from the Motorola family or MIPS family of microprocessors. In an alternative embodiment, processor 63 is specially designed hardware for controlling the operations of network device 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the network device 10. All or parts of an implementation of the invention may be performed on such an interface. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, link layer control, and management. By providing separate processors for the communications intensive tasks, these interfaces allow the master microprocessor 61 to efficiently perform routing computations, network diagnostics, security functions, etc. Network device 10 may further include a packet memory 72 for intermediate storage of packets being forwarded by network device 10.

Although the system shown in FIG. 1 is one specific network device of the present invention, it is by no means the only architecture on which the present invention can be implemented. For example, an architecture having a single processor that handles communications as well as routing computations, etc. is often used. Further, other types of interfaces and media could also be used with the network device.

Regardless of a network device's configuration, it may employ one or more memories or memory modules (including memory 62) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Recommendation Q.922: Cases Where Unsynchronized SVC Establishment Occur

Recommendation Q.922 allows for and does not resolve the problematic instances of unsynchronized SVC establishment as described below. In particular, there may be circumstances when an LAPF link to a device goes down. The LAPF may go down when the device brings down the LAPF link, such as when there is an internal system error or a system reload, or when the device determines that the LAPF link is down, such as in response to the physical line being down. When the LAPF link to the device goes down, the peer device to the device with the LAPF down link is not aware of the situation because the device with the LAPF down link does not or cannot send a message to inform the peer device or the message sent by the device with the LAPF down link fails to reach the peer device. Thus, the device with the LAPF down link tears down or releases all of its previously established SVCs while the peer device is still operating assuming that the previously established SVCs are active.

When the physical link resumes functionality, i.e., is brought back up, the device with the previously down link resumes and executes the establish data link procedure to reestablish layer 2 (link layer) connectivity. However, when the physical link resumes functionality within a threshold period of time, the peer device has not left the timer recovery state (state 8) specified by Q.922 or the multiple frame established state (state 7) specified by Q.922 to the awaiting establishment state (state 5) specified by Q.922. Thus, an erroneous and problematic case arises where the device with the previously down LAPF link has all previously built SVCs released but the peer device, on the other hand, is still operating with the previously built SVCs.

Such a problematic situation with unsynchronized SVC establishment is further described with reference to FIG. 2.

Figure 2:
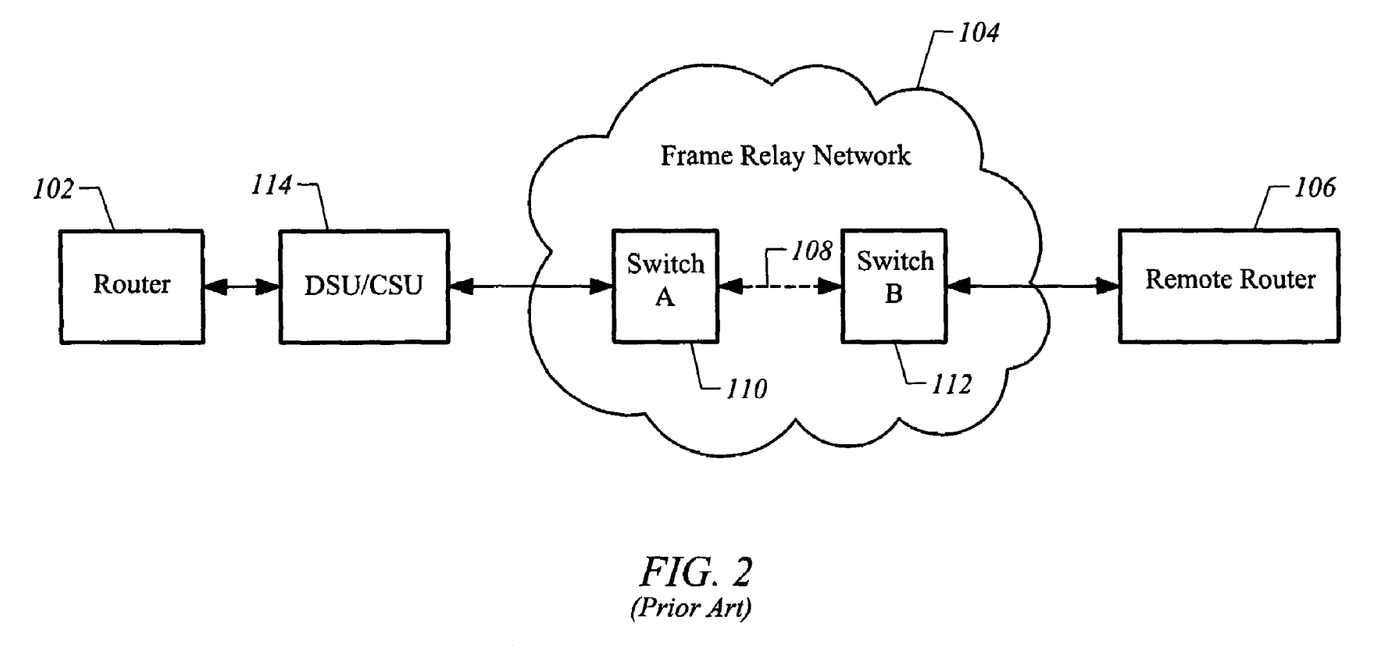
FIG. 2 depicts a network device according to one embodiment of the present invention.

FIG. 2 is a block diagram illustrating devices interoperating in a typical Frame Relay scenario. Any of the depicted devices may be implemented along the lines described in reference to FIG. 1. In the example shown, a user device router 102 is connected via a Frame Relay network 104 to a remote router 106. An SVC may be established between user device router 102 and remote router 106.

As is known in the art, the SVC is a temporary virtual circuit that is set up between two hosts and used only as long as data is being transmitted between the two hosts. Once the communication between the two hosts is complete, the SVC is brought down. SVC layer 2 (the data link layer) is responsible for physically passing data from one node to another. LAPF is a protocol for SVC layer 2 and is specified by Recommendation Q.922. SVC layer 3 (the network layer) is responsible for routing data from one node to another and is the call control.

Typically, packets flowing between user device router 102 and remote router 106 are switched through the frame relay network 104 via a number of switches as depicted by a dashed line 108. However, although a switch A 110 and a switch B 112 are shown as distinct switches, switches 110 and 112 may be a single switch such that user device router 102 and remote router 106 communicate via a single switch of the frame relay network 104.

A channel service unit/data service unit (CSU/DSU) 114 may be provided by the service provider between user device router 102 and Frame Relay network 104. A CSU/DSU is typically utilized to transmit data between a data termination equipment (DTE) and a data communication equipment (DCE). In the example shown, user router 102 is considered the DTE and switch A 110 is considered the DCE. CSU/DSU 114 functions as a DSU toward user device router 102 and as a CSU toward switch A 110 of the frame relay network. In particular, a CSU is a device that connects a terminal to a digital line and a DSU is a device that performs protective and diagnostic functions for a telecommunications channel.

The application of the present invention will be described with reference to the link layer interaction between user device router 102 and switch A 110. User device router 102 is capable of detecting that a physical interface is down, such as when the physical interface is removed or is otherwise not functioning properly. User device router 102 reacts to such detection of a down physical interface by bringing down the layer 2 link and releasing all layer 3 SVCs that were built. Switch A 110 will continue, for an interval, to assume that the link layer is still active and that the SVCs are still established.

If the physical layer resume functionality, i.e., are brought back up, within a certain threshold time period, user device router 102 will have released all the previously established SVCs while the switch A 110 continues to operate as if the previously established SVCs were never released and are still up. This threshold time may be the maximum amount of time for the peer device to transition from the timer recovery state (state 8) defined in Recommendation Q.922 to the awaiting establishment state (state 5) defined in Recommendation Q.922. There may be no effective method to recover from such an unsynchronized SVC establishment situation.

The threshold period of time may be expressed (in seconds) as:

$$T200*N200*2$$

where T200 is the retransmission timer which is set to 1.5 seconds by default, N200 is the retransmission counter which is set to 3 by default, and the product of T200 and N200 is multiplied by 2 to account for an attempt at transmission. Thus, the threshold time period is 9 seconds by default.

On the other hand, if the physical layer resumes functionality, i.e., is brought back up, after expiration of the threshold time period, i.e., after 9 seconds by default, the switch A 110 will have determined the existence of an error. In such a case, the switches will declare an error with layer 2 such that all previously built SVCs will be released. In this situation, the problematic situation with the unsynchronized SVC establishment does not occur.

Modification or Extended Logic for Recommendation Q.922

According to the present invention, Recommendation Q.922 is modified or extended to address the above-described problem with unsynchronized SVC establishment. An embodiment of the present invention will be described in terms of modifications to the point-to-point link layer state machine description found in Annex B to Recommendation Q.922. An overview of the various states and transitions between states is shown in FIG. B-1 in Annex B. More detailed depictions of the state machine operation are shown in FIG. B-3 through B-9 of Annex B.

The discussion herein will also mention various messages including DISC, SABME, UA, DM, etc. These messages are defined by Section 3.6.1 of ITU Recommendation Q.921. Other layer to layer communication elements such as DL-ESTABLISH, MDL-ERROR, etc. are described in Section 4.1 of ITU Recommendation Q.921.

In one embodiment, the modification or extended logic for Recommendation Q.922 is generally limited to the TEI (terminal equipment identifier) assigned state (state 4) and the awaiting establishment state (state 5). These modifications to the transitions to and from these states of Recommendation Q.922 are described in more detail below.

The state logic of Recommendation Q.922 as well as the modification described herein apply to link layer operation of a single device. The single device may be, e.g., a user device such as user device router 102 or the link layer peer of user device router 102, e.g., switch A 110, the network side device. The modification may be installed and enabled at either side of the link or both. To alleviate the SVC establishment synchronization problem described above, the device that experiences the dropped physical layer should be equipped with the modification. Although the modification may be installed at either end or both ends, the discussion below will assume installation at user device router 102 which will now be referred to as the user device. This corresponds to the greater likelihood that physical layer connectivity will be lost at the user side rather than the network side. The network side device such as switch A 110 will be referred to as the peer. Any suitable device or combination of devices may incorporate the modification to Recommendation Q.922 as described below.

The modifications affect the behavior of the user device when it sets up a link including when the link is set up after being down previously. Instead of transmitting a SABME message to the peer device as specified by the unmodified Recommendation Q.922, the user device transmits a DISC message to cause the peer device to clear or release previously established SVCs.

Figure 3:
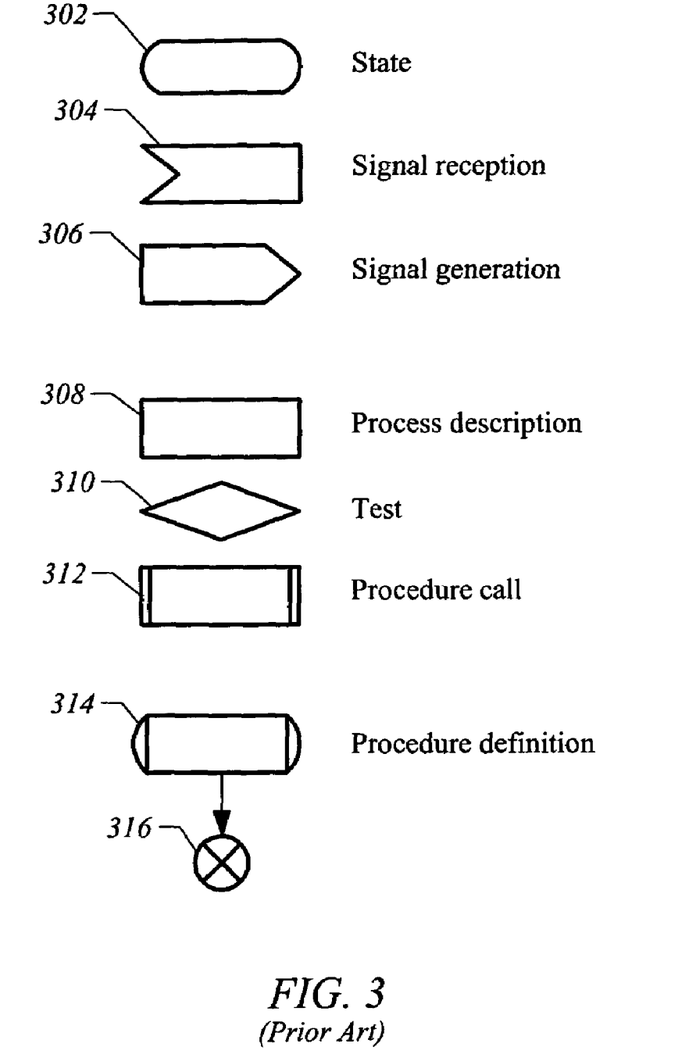
FIG. 3 depicts a legend for interpreting the block diagrams of FIGS. 4A–4B and 5A–5B.

The modifications will be described with reference to state transition diagrams which show the changes to the state transition behavior specified by Recommendation Q.922. The depictions of state transitions are according to State Description Language (SDL). FIG. 3 is a legend of the symbols used in FIGS. 4A–4B and FIGS. 5A–5B. A first symbol. 302 represents a state. A second symbol 304 represents reception of a signal. A third symbol 306 represents generation of a signal. A fourth symbol 308 represents a process described within the symbol. A fifth symbol 310 represents a test of a condition. A sixth symbol 312 represents a call to a procedure defined elsewhere. A seventh symbol 314 represents the beginning of a procedure definition. An eighth symbol 316 represents the end of the procedure definition and a return to the point after the procedure call that called the procedure.

The state transition diagram depictions of FIGS. 4A–4B and FIGS. 5A–5B show modifications to Recommendation Q.922 in the context of the unmodified state transition diagrams presented in Annex B to that document. A dashed line surrounds the blocks added to implement the modification. The discussion will focus on the modification rather than the prior art state machine operation according to Recommendation Q.922.

Modifications to State 4: The TEI Assigned State

Figure 4A:
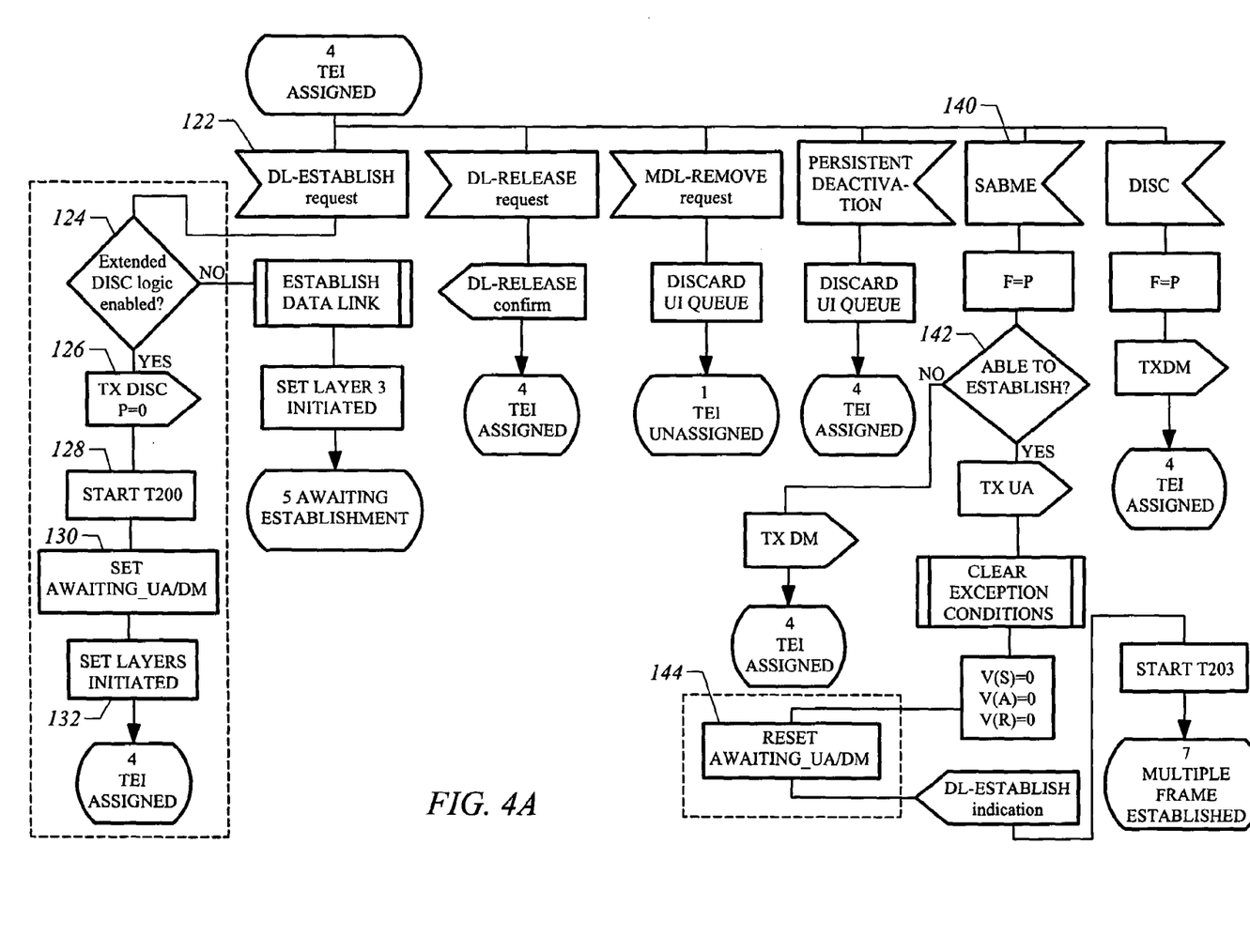
FIGS. 4A and 4B are block diagrams that collectively illustrate the modifications to processes the device implements in response to signals received while the device is in the TEI assigned state (state 4) according to a modified or extended logic of Recommendation Q.922.
Figure 4B:
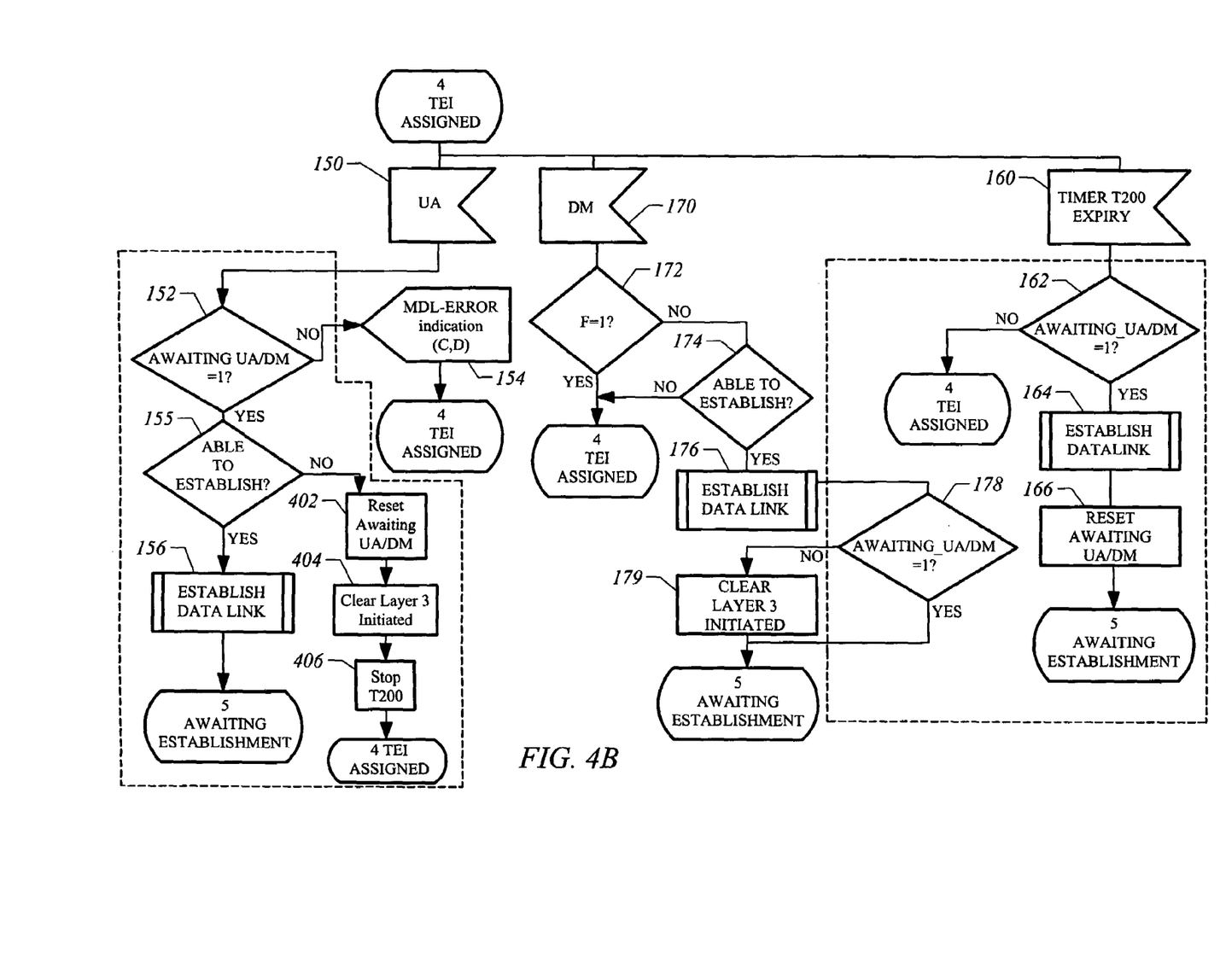

FIGS. 4A–4B are block diagrams that collectively illustrate the modifications to processes the device implements in response to signals received while the device is in the TEI assigned state (state 4) according to a modified or extended logic of Recommendation Q.922. The device either remains in state 4 or transitions to the next state. The modification includes utilization of an AWAITING_UA/DM flag, for indication of whether the user device is awaiting a response to the DISC message sent to prepare for establishment of the link.

As shown in FIG. 4A, in response to a DL-ESTABLISH request (a request to establish a data link) from the management plane at event 122, the device may execute a sequence of steps and remain in the TEI assigned state (state 4) if the extended DISC logic is enabled or transition to the awaiting establishment state (state 5) if the extended DISC logic is not enabled. The step 124 of determining whether the extended DISC logic is enabled in the device allows the device to be configurable such that the device may selectively operate with extended DISC logic or without the extended DISC logic. However, this selective functionality need not be implemented such that the device would simply always operate with the extended DISC logic. Accordingly, the sequence of steps 126–132 leading to a transition to the awaiting establishment state (state 5) in response to receiving DL-ESTABLISH request message at event 122 would be eliminated from the processes of the TEI assigned state (state 4).

The sequence of steps executed by the device while in state 4 in response to a DL-ESTABLISH request message from the peer device will now be described. In particular, at step 126, the device transmits a DISC message (a disconnect request message) with the P bit set to 0 to the peer device to inform the peer device that the device's layer 2 was down and instructs the peer device to release the previously established SVCs. The device also starts the retransmission timer T200 at step 128, sets the AWAITING_UA/DM flag to 1 at step 130, and performs the "Sets Layer 3 Initiated" step as known in the art at step 132. Steps 126–132 need not be performed in the sequence shown and may be performed in any desired suitable sequence.

In another case, when the peer device transmits a SABME message to the device when the device is in state 4 after the link resumes connectivity, such transmission indicates that the peer device is also ready to reestablish the layer 2 and that the peer device has also released the previously established SVCs. Thus, the AWAITING_UA/DM flag is reset, i.e., set to 0. Referring again to FIG. 4A, in response to receiving a SABME message at event 140 from the peer device and after the device determines that the device is able to establish a data link in step 142 (as specified by the Q.922 recommendation), the device resets the AWAITING_UA/DM flag to 0 at step 144. The AWAITING_UA/DM flag is reset to 0 in this situation because the device directly transitions to state 7 rather then to state 5 in which the flag would typically be reset to 0.

In one embodiment, the resetting step is between two particular steps specified by Recommendation Q.922: resetting of the V(S), V(A), and V(R) parameters and transmission of a DL-ESTABLISH indication message. However, the step of resetting of the AWAITING_UA/DM flag can be executed anytime after determining that the device is able to establish a data link at step 142 but prior to the device transitioning to the multiple frame established state (state 7).

Referring now to FIG. 4B, in response to receiving a UA message at event 150 from the peer device, the user device checks if it is expecting a UA/DM message at step 152 by determining if the AWAITING_UA/DM flag is set. If not, i.e., if the flag has a value of 0, the device proceeds according to the specification of Recommendation Q.922 with an MDL-ERROR indication at step 154 and the device remains in state 4. Alternatively, if the AWAITING_UA/DM flag is set, i.e., the flag has a value of 1, the user device checks if it is able to establish a data link at step 155. If the user device is able to establish a data link, it executes the establish data link procedure at step 156 and transitions to the awaiting establishment state (state 5). The establish data link procedure is defined by Recommendation Q.922 and includes sending a SABME message (request for connection to establish link message) to the peer device. If the user device is not able to establish a data link, it performs the steps of resetting the AWAITING_UA/DM flag (step 402), performing a "Clear Layer 3 Initiated" (step 404), and stopping timer T200 (step 406) before returning to the TEI assigned state (state 4).

Referring again now to FIG. 4B, in response to the expiration of retransmission (awaiting-response) timer T200 at event 160, the device determines if it is awaiting a UA/DM message from the peer device at step 162. If not, the device remains in state 4 because Recommendation Q.922 does not utilize the retransmission timer T200 in state 4. However, if the device is awaiting a UA/DM message from the peer device when the retransmission timer T200 times out, the device executes the establish data link procedure at step 164 and resets the AWAITING_UA/DM flag, i.e., to 0, at step 166 and transitions to the awaiting establishment state (state 5). In particular, such a situation indicates that the peer device is not responding to the DISC message the device previously transmitted.

Another modification to the logic of Recommendation Q.922 involves the process followed in response to receiving a DM message from the peer device. Upon receiving a DM message from the peer device at event 170, the device determines if the F bit in the DM message is set at step 172. If not, the user device tests if it is able to establish a data link at step 174. If the user device is able to establish a data link, it does so at step 176. The user device tests if the AWAITING_UA/DM flag is set, i.e., has a value of 1 at step 178. If the flag is set, the device skips step 179, "Clear Layer 3 Initiated."

Note that when the peer device transmits a DM message at event 170, the router device would remain in state 4 if the F bit of the DM message is set to 1 or would attempt to transition to the awaiting establishment state (state 5) if the F bit is set to 0. Thus, as discussed above, when the device transmits the DISC message from within state 4, the P bit of the DISC message is set to 0 such that if the peer device responds with a DM message, the DM message would contain a 0 value for the F bit. The 0 value for the F bit in the DM message would ensure that the modified process causes the device to transition to the desired next state, state 5.

The above described modifications in effect causes additional messages to be transmitted between the user device and the peer device prior to the user device transitioning to state 5. In other words, regardless of whether the user device is in a situation where the link resumes connectivity after the link was down, the user device transmits a DISC message, sets the AWAITING_UA/DM flag, awaits UA or DM message from the peer device, and transitions to state 5 when the expected UA or DM message from the peer device arrives.

Modifications to State 5: The Awaiting Establishment State

Figure 5A:
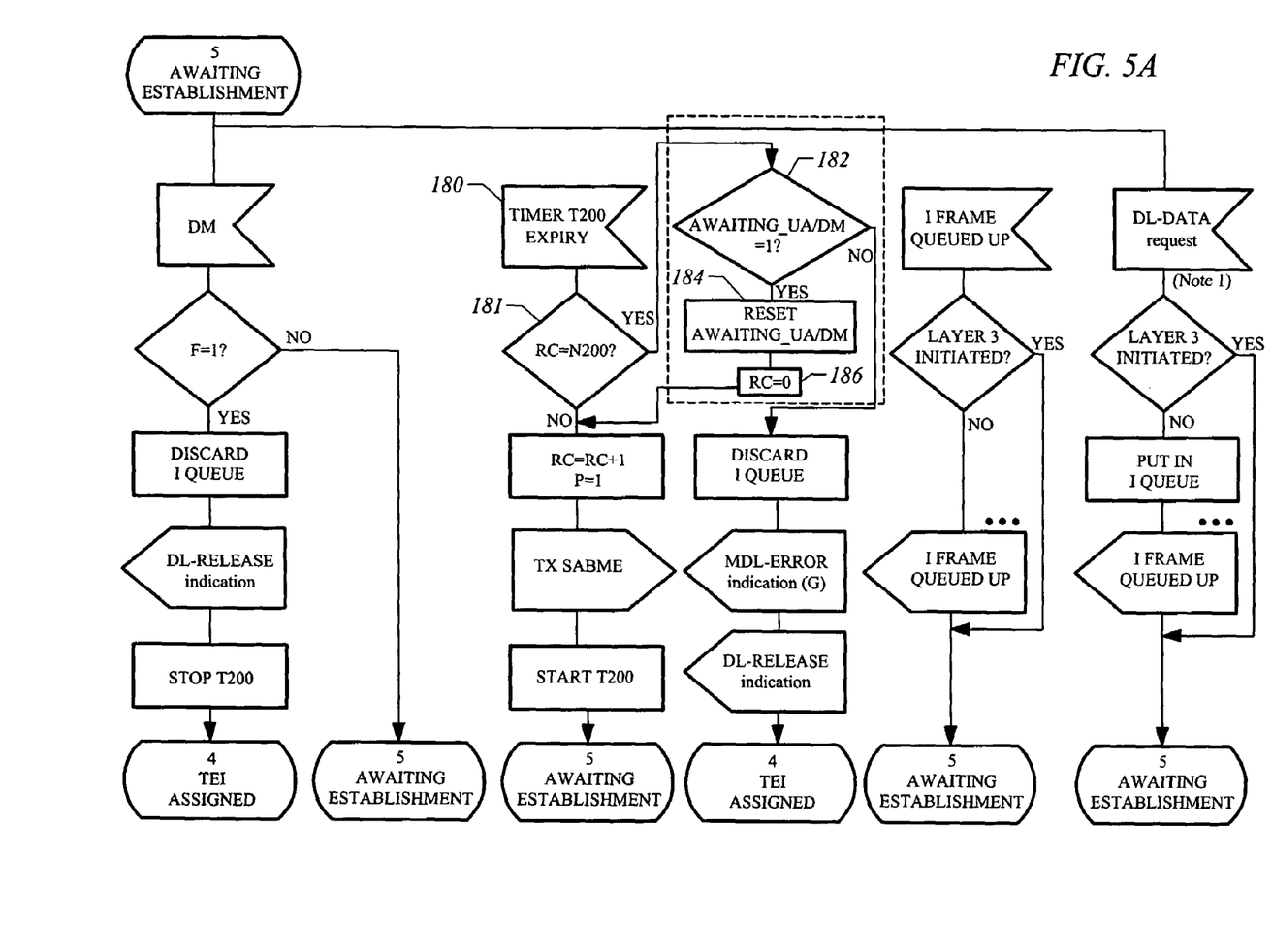
FIGS. 5A and 5B are block diagrams that collectively illustrate the modifications to processes the device implements in response to signals received while the device is in the awaiting establishment state (state 5) according to a modified or extended logic of Recommendation Q.922.
Figure 5B:
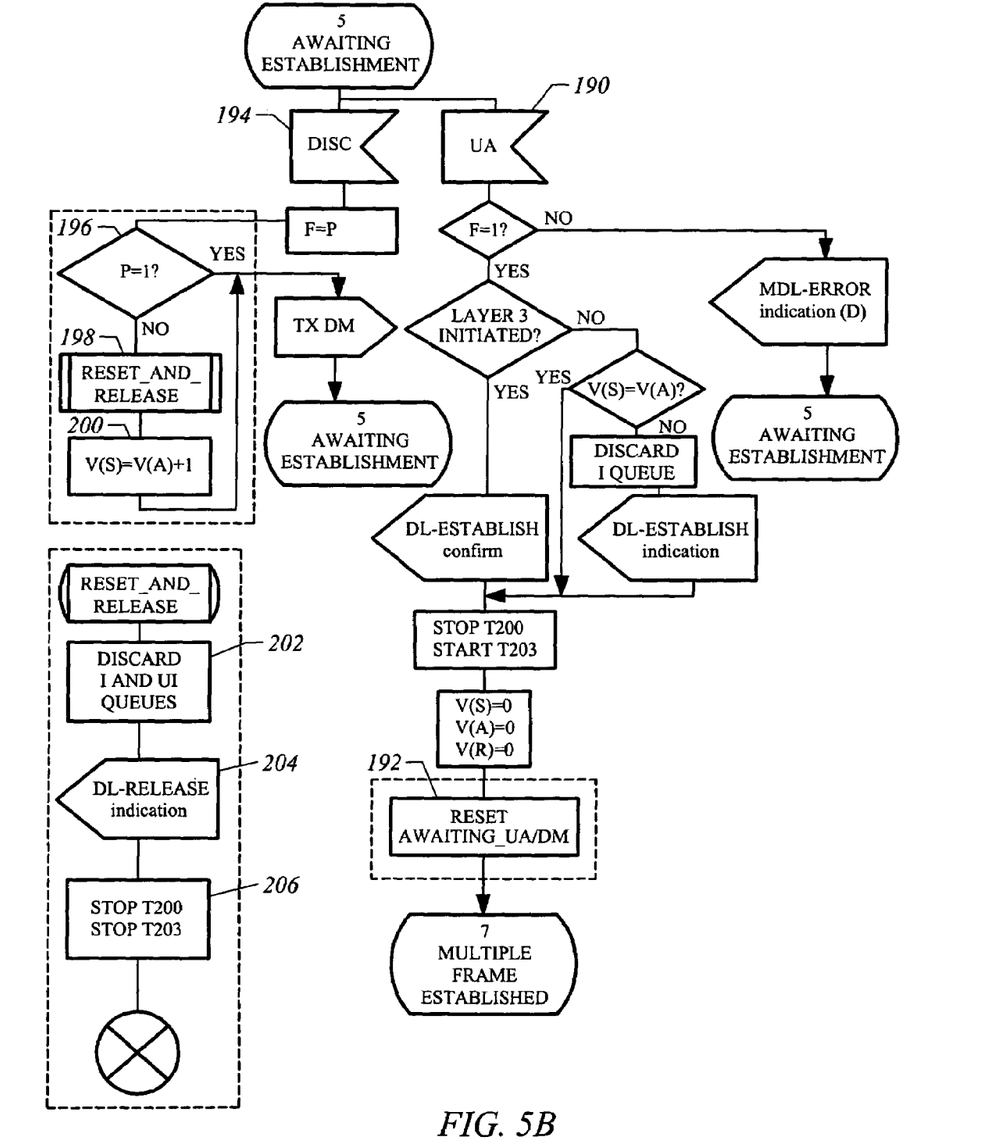

FIGS. 5A and 5B are block diagrams that collectively illustrate the modifications to processes the user device implements in response to signals received while the user device is in the awaiting establishment state (state 5) according to a modified or extended logic of Recommendation Q.922. The user device may either remain in state 5 or transition to the next state.

As shown in FIG. 5A, upon expiration of timer T200 at event 180, if the RC (retry counter) has reached N200 as determined at step 181, then it is determined whether the AWAITING_UA/DM flag is set at step 182. If the flag has a value of 0, the device proceeds as it would have following a yes indication at step 181 according to the specification of Recommendation Q.922 with MDL-ERROR and DL-RELEASE indications and the device transitions to state 4. Alternatively, if the AWAITING_UA/DM flag is set, i.e., the flag has a value of 1, then the device resets the AWAITING_UA/DM flag and RC to 0 at steps 184 and 186, respectively, and proceeds to execute the Q.922 process for RC not having reached N200, namely, increment RC, set P bit to 1, transmit SABME, and start timer T200, and then remain in state 5. The modification here consists of steps 182, 184, and 186 while steps 180 and 181 are as specified by the Q.922 Recommendation.

Referring now to FIG. 5B, another modification involves the process followed when the user device receives a UA message at event 190 with the F bit set to 1. In particular, a resetting of the AWAITING_UA/DM flag to 0 at step 192 is inserted after a transmission of either a DL-ESTABLISH confirm or a DL-ESTABLISH indication and prior to the user device transitioning to the multiple frame established state (state 7). It is to be understood that although in one embodiment, the resetting step 192 is after the specified resetting of the V(S), V(A), and V(R) parameters, step 192 can be executed anytime after the transmission of a DL-ESTABLISH confirm or indication message but prior to the transition to the multiple frame established state (state 7).

Also shown in FIG. 5B, another modification involves the process followed when the user device receives a DISC message at event 194. Specifically, prior to the specified transmission of the DM message, the device determines if the P bit is set at step 196. If the P bit of the DM message is set to 1, the device proceeds according to the specification of Recommendation Q.922. Alternatively, if the P bit of the DM message has a value of 0, then a RESET_AND_RELEASE procedure 198 as defined below is executed and V(S) is set to V(A)+1 at step 200. As shown, the RESET_AND_RELEASE procedure 198 includes discarding I and UI queues at step 202, transmitting a DL-RELEASE indication at step 204, and stopping timers T200 and T203 at step 208.

It is to be understood that, although the modification starting with the determination step 196 is shown to be after the step of setting the F bit equal to the P bit as an exemplary implementation, the modification may be implemented at any point after receipt of the DISC message.

Figure 6:
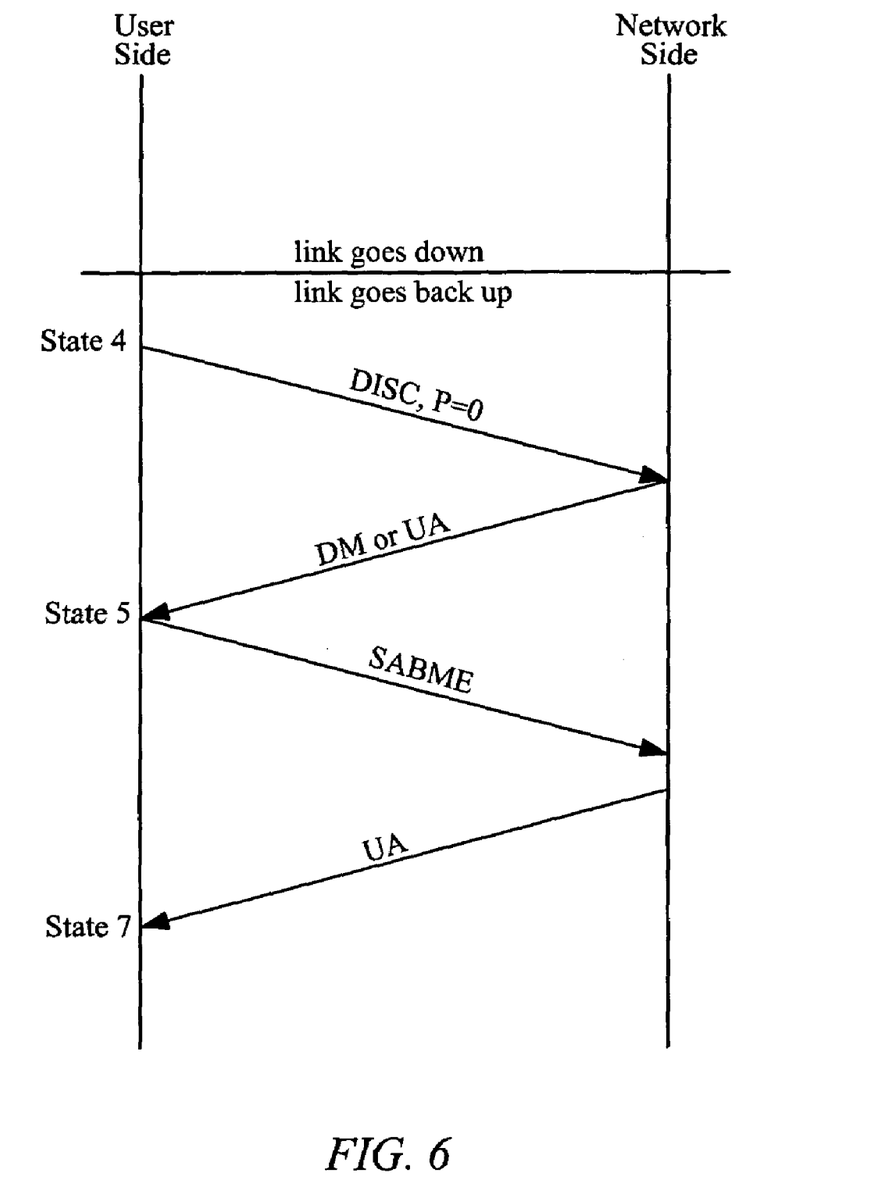
FIG. 6 illustrates message transmissions over time between a device such as a router and a peer device such as a switch according to the modified or extended DISC logic.

FIG. 6 is a top level illustration of message transmissions over time between a user device such as a router and a peer device such as a switch according to the modified or extended DISC logic. In the situation illustrated, the LAPF link then goes down and subsequently regains functionality. When the device reaches the TEI assigned state (state 4), the peer device may be in any of the multiple frame established state (state 7), timer recover state (state 8), or awaiting release state (state 6) such that, if the logic of Recommendation Q.922 were implemented, the case with the unsynchronized SVC establishment would occur.

According to the modified DISC logic, when the LAPF link regains functionality, the device transmits a DISC message with the P bit set to 0. The peer device then transmits a DM or UA message in response to the DISC message. The device then transmits a SABME message to establish the data link and the peer device responds with a UA message. At this point, both the user device and peer device are in the multiple frame established state (state 7) and connectivity between the device and the peer device is established.

The modification or extension of the DISC logic of the Recommendation Q.922 described herein provides several advantages. The modification resolves or alleviates the problem of unsynchronized SVC establishment status after the LAPF link is brought back up. The resolution is accomplished in a flexible manner such that it can be enabled or disabled by configuring the device as needed. Further, the modification does not appear to introduce any interoperability problems. Specifically, in tests, a router implementing the modified logic with the DISC logic enabled is able to peer with a router implementing the modified logic with or without the DISC logic enabled as well as with a router implementing the conventional Recommendation Q.922 logic. Similarly, in tests, a router implementing the modified logic without the DISC logic enabled is able to peer with a router implementing the modified logic without the DISC logic enabled and with a router implementing the conventional Recommendation Q.922 logic.

The methods and processes described herein and/or data for use with the methods and processes, for example, may be implemented in computer codes incorporated in software programs. Examples of computer or program code include machine code, as produced, for example, by a compiler, or files containing higher level code that may be executed using an interpreter.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for a first device to reestablish a link between the first device and a second device, comprising:

transmitting an ITU Recommendation Q.921 disconnect request message from the first device in ITU Recommendation Q.922 terminal equipment identifier (TEI) assigned state (state 4) to the second device in response to the link between the first device and the second device going down;

starting an awaiting response timer to start;

upon any of expiration of the awaiting-response timer, receiving an ITU Recommendation Q.921 disconnect mode message from the second device, or receiving a Q.921 acknowledgement message from the second device, transmitting an ITU Recommendation Q.921 request for connection to establish link from the first device to the second device;

after transmitting the disconnect request message to the second device and upon receiving an acknowledgement message from the second device, determining if an awaiting-response-to-the-disconnect-message flag is set; and transitioning the first device to ITU Recommendation Q.922 (state 5);

wherein the first device transmits the request for connection to establish link to the second device upon receiving an acknowledgement message from the second device only if the awaiting-response-to-the-disconnect-message flag is set.

2. The method of claim 1, wherein the disconnect request message transmitted by the first device to the second device includes a poll bit set to 0.

3. The method of claim 1, further comprising setting the awaiting-response-to-the-disconnect-message flag in response to receiving a data link establishment request.

4. The method of claim 1 wherein said disconnect request message comprises a disconnect (DISC) message as specified by ITU Recommendation Q.921.

5. A computer program product for enabling a first device to reestablish a link between the first device and a second device, said computer program product comprising:

code that causes transmission of an ITU Recommendation Q.921 disconnect request message from the first device in ITU Recommendation Q.922 terminal equipment identifier (TEI) state (state 4) to the second device in response to the link between the first device and the second device going down;

code that causes an awaiting response timer to start;

code that causes, upon any of expiration of the awaiting-response timer, receiving an ITU Recommendation Q.921 disconnect mode message from the second device, or receiving an ITU Recommendation Q.921 acknowledgement message from the second device, transmitting an ITU Recommendation Q.921 request for connection to establish link from the first device to the second device;

code that causes, after transmitting the disconnect request message to the second device and upon receiving an acknowledgement message from the second device, determining if an awaiting-response-to-the-disconnect-message flag is set;

code that causes transitioning of the first device to ITU Recommendation Q.922 awaiting establishment state (state 5); and a computer-readable medium for storing the codes;

wherein the first device transmits the request for connection to establish link to the second device upon receiving an acknowledgement message from the second device only if the awaiting-response-to-the-disconnect-message flag is set.

6. The product of claim 5, wherein the disconnect request message transmitted by the first device to the second device includes a poll bit set to 0.

7. The product of claim 5, further comprising code that causes setting of the awaiting-response-to-the-disconnect-message flag in response to receiving a data link establishment request.

8. The product of claim 5 wherein said disconnect request message comprises a disconnect (DISC) message as specified by ITU Recommendation Q.921.

9. A first device that reestablishes a link to a second device, said first device comprising:

a processor that executes software; and a computer-readable storage medium that stores the software, said software comprising:

code that causes said processor to transmit an ITU Recommendation Q.921 disconnect request message from the first device in ITU Recommendation Q.922 terminal equipment identifier (TEI) assigned state (state 4) to the second device in response to the link between the first device and the second device going down;

code that causes a transmission timer to start;

code that causes said processor to, upon any of the transmission timer expiration, receiving an ITU Recommendation Q.921 disconnect mode message from the second device, or receiving ITU Recommendation Q.921 acknowledgement message from the second device, transmit an ITU Recommendation Q.921 request for connection to establish link from the first device to the second device;

code that, after transmitting the disconnect request message to the second device and upon receiving an acknowledgement message from the second device, causes said processor to determine if an awaiting-response-to-the-disconnect-message flag is set; and code that causes transitioning of the first device to ITU Recommendation Q.922 awaiting establishment state (state 5);

wherein the first device transmits the request for connection to establish link to the second device upon receiving an acknowledgement message from the second device only if the awaiting-response-to-the-disconnect-message flag is set.

10. The first device of claim 9, wherein the disconnect request message transmitted by the first device to the second device includes a poll bit set to 0.

11. The first device of claim 9, wherein said software further comprises code that causes said processor to set the awaiting-response-to-the-disconnect-message flag in response to receiving a data link establishment request.

12. The first device of claim 9 wherein said disconnect request message comprises a disconnect (DISC) message as specified by ITU Recommendation Q.921.

13. An apparatus for a first device to reestablish a link between the first device and a second device, said apparatus comprising:

means for transmitting an ITU Recommendation Q.921 disconnect request message from the first device in ITU Recommendation Q.922 terminal equipment identifier (TEI) assigned state (state 4) to the second device in response to the link between the first device and the second device going down;

means for starting an awaiting-response timer;

means for, upon any of expiration of the awaiting-response timer, receiving an ITU Recommendation Q.921 disconnect mode message from the second device, or receiving Q.921 acknowledgement message from the second device, transmitting an ITU Recommendation Q.921 request for connection to establish link from the first device to the second device;

means for, after transmitting the disconnect request message to the second device and upon receiving an acknowledgement message from the second device, determining if an awaiting-response-to-the-disconnect-message flag is set; and means for transitioning the first device to ITU Recommendation Q.922 awaiting establishment state (state 5);

wherein the first device transmits the request for connection to establish link to the second device upon receiving an acknowledgement message from the second device only if the awaiting-response-to-the-disconnect-message flag is set.

14. The apparatus of claim 13, wherein the disconnect request message transmitted by the first device to the second device includes a poll bit set to 0.

15. The apparatus of claim 13, further comprising means for setting the awaiting-response-to-the-disconnect-message flag in response to receiving a data link establishment request.

16. The apparatus of claim 13 wherein said disconnect request message comprises a disconnect (DISC) message as specified by ITU Recommendation Q.921.

* * * * *